(12) United States Patent
Whang et al.

(10) Patent No.: US 11,313,457 B2
(45) Date of Patent: Apr. 26, 2022

(54) APPARATUS AND METHOD FOR CONTROLLING DRIVING OF VEHICLE

(71) Applicants: Hyundai Motor Company, Seoul (KR); Kia Motors Corporation, Seoul (KR)

(72) Inventors: Jin Young Whang, Yongin-si (KR); Jae Joon Lee, Anyang-si (KR); Jong Sool Park, Hwaseong-si (KR); Jin Ho Kim, Suwon-si (KR); Jong Sung Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 33 days.

(21) Appl. No.: 16/931,853

(22) Filed: Jul. 17, 2020

(65) Prior Publication Data
US 2021/0246979 A1 Aug. 12, 2021

(30) Foreign Application Priority Data
Feb. 10, 2020 (KR) .................. 10-2020-0015589

(51) Int. Cl.
*F16H 59/36* (2006.01)
*F16H 61/02* (2006.01)
*F16H 59/00* (2006.01)

(52) U.S. Cl.
CPC ......... *F16H 59/36* (2013.01); *F16H 61/0213* (2013.01); *F16H 2059/003* (2013.01); *F16H 2059/366* (2013.01); *F16H 2061/0234* (2013.01)

(58) Field of Classification Search
CPC .... F16H 59/36; F16H 59/18; F16H 2059/366; F16H 2059/003; F16H 2059/186; F16H 61/0213; F16H 2061/0015; F16H 2061/0234
See application file for complete search history.

(56) References Cited

U.S. PATENT DOCUMENTS

| 4,473,882 | A | * | 9/1984 | Suzuki | B60W 10/06 192/3.31 |
|---|---|---|---|---|---|
| 2014/0315686 | A1 | * | 10/2014 | Matsuo | F16H 61/10 477/120 |
| 2018/0162368 | A1 | * | 6/2018 | Kim | B60K 6/36 |
| 2019/0024791 | A1 | * | 1/2019 | Waku | F16H 61/66 |
| 2019/0264802 | A1 | * | 8/2019 | Okumura | F16H 61/686 |

* cited by examiner

*Primary Examiner* — Edwin A Young
(74) *Attorney, Agent, or Firm* — Morgan, Lewis & Bockius LLP

(57) ABSTRACT

An apparatus and a method for controlling driving of a vehicle may include a first sensor that detects whether an accelerator pedal is pressed, a second sensor that detects a number of RPM of an engine, and a controller that determines whether the vehicle coasts based on whether the accelerator pedal is pressed, and determines whether to change a gear ratio of a transmission based on the number of RPM of the engine so that the coasting distance is increased in the coasting deceleration section, improving the fuel efficiency.

11 Claims, 4 Drawing Sheets

APPARATUS AND METHOD FOR CONTROLLING DRIVING OF VEHICLE

CROSS-REFERENCE TO RELATED APPLICATION

The present application claims priority to Korean Patent Application No. 10-2020-0015589, filed on Feb. 10, 2020, the entire contents of which is incorporated herein for all purposes by this reference.

BACKGROUND OF THE PRESENT INVENTION

Field of the Invention

The present invention relates to an apparatus and a method for controlling driving of a vehicle.

Description of Related Art

Because a vehicle having higher fuel efficiency can travel a longer distance with the same fuel amount, the fuel efficiency of a vehicle is an important criterion for the user to select the vehicle, so that techniques for improving fuel efficiency have been developed. In general, to improve fuel efficiency, a vehicle is controlled to use the engine in a region in which the engine has higher engine efficiency higher than at a constant speed in an acceleration section and to cut off the fuel to coast down at the time of deceleration.

During fuel cut control during coasting deceleration, the position of a shift lever is maintained at a position 'D' to prevent the engine from being turned off, and the RPM of the engine is maintained corresponding to the preset gear ratio. If the RPM of the engine is maintained at a specified speed or greater by a preset gear ratio, the resistance increases so that the actual mileage is reduced, reducing the overall fuel efficiency.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and a method for controlling driving of a vehicle which can increase the coasting mileage by preventing the RPM from being unnecessarily increased in a coasting deceleration section.

The technical problems to be solved by the present inventive concept are not limited to the aforementioned problems, and any other technical problems not mentioned herein will be clearly understood from the following description by those skilled in the art to which an exemplary embodiment of the present invention pertains.

According to various aspects of the present invention, an apparatus of controlling driving of a vehicle includes a first sensor that detects whether an accelerator pedal is pressed, a second sensor that detects a number of RPM of an engine, and a controller that determines whether the vehicle coasts based on whether the accelerator pedal is pressed, and determines whether to change a gear ratio of a transmission based on the number of RPM of the engine when the vehicle coasts.

The controller may be configured to determine whether the number of RPM of the engine exceeds a threshold value, and determine whether a current gear ratio is a highest gear ratio.

The controller may be configured to determine the number of RPM of the engine corresponding to a gear ratio higher than the current gear ratio when the current gear ratio is not equal to the highest gear ratio.

The controller may be configured to determine whether the determined number of RPM of the engine exceeds the threshold value, and change the current gear ratio upshift when the determined number of RPM of the engine exceeds the threshold value.

The controller may change the current gear ratio downshift when the number of RPM of the engine does not exceed the threshold value.

The controller may be configured to control to maintain a preset gear ratio when the controller is configured to determine that the accelerator pedal is pressed.

According to various aspects of the present invention, a method of for controlling driving of a vehicle includes detecting whether an accelerator pedal of the vehicle is pressed and a number of RPM of an engine, and determining whether the vehicle coasts based on whether the accelerator pedal is pressed, and determining whether to change a gear ratio of a transmission based on the number of RPM of the engine when the vehicle coasts.

The method may further include determining whether the number of RPM of the engine exceeds a threshold value, and determining whether a current gear ratio of the transmission is equal to a highest gear ratio when the number of RPM of the engine exceeds the threshold value.

The method may further include determining the number of RPM of the engine corresponding to a gear ratio higher than the current gear ratio when the current gear ratio is not equal to the highest gear ratio.

The method may further include determining whether the determined number of RPM of the engine exceeds the threshold value, and changing the current gear ratio upshift when the determined number of RPM of the engine exceeds the threshold value.

The method may further include changing the current gear ratio downshift when the number of RPM of the engine does not exceed the threshold value.

The method may further include controlling to maintain a preset gear ratio when the accelerator pedal is determined to be pressed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
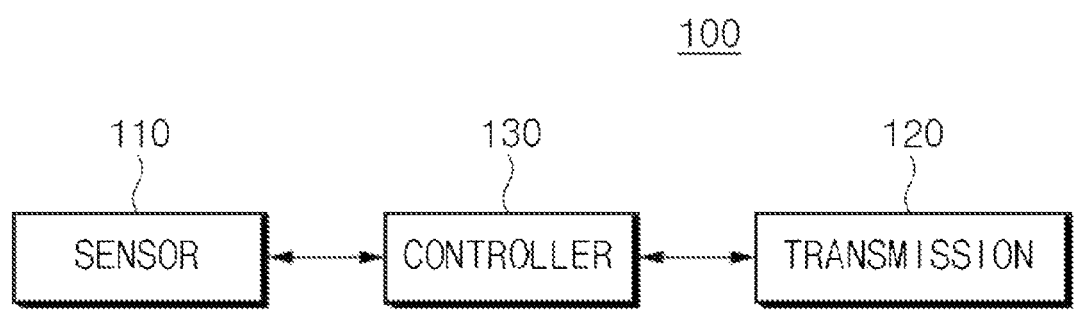
FIG. 1 is a block diagram showing the configuration of a vehicle driving control apparatus according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which an exemplary embodiment of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram showing the configuration of a vehicle driving control apparatus according to an exemplary embodiment of the present invention.

As shown in FIG. 1, an apparatus 100 for controlling driving of a vehicle may include a sensor 110, a transmission 120, and a controller 130.

The sensor 110 may detect driving information related to a vehicle. According to an exemplary embodiment of the present invention, the driving information related to the vehicle may include information related to on a pressed state of an accelerator pedal for controlling a speed of the vehicle to be increased or decreased, speed information related to the vehicle, information related to the number of RPM of the engine, and the state information related to a gear ratio (current shift level input information). To this end, the sensor 110 may include a speed sensor, an engine rotation speed sensor, a shift lever position sensor, and the like.

The transmission 120 refers to a device configured for shifting the power of the engine to the driving speed of the vehicle between the engine and the driving wheels of the vehicle. As the shift level of the transmission is lowered, the number of revolution per a minute (RPM) of the engine is increased, and as the shift level of the transmission is increased, the number of RPM of the engine is decreased.

The controller 130 may be implemented with various processing devices such as a microprocessor in which a semiconductor chip or the like that can perform operations or executions of various instructions, and may control operations of an apparatus of controlling driving of a vehicle according to an exemplary embodiment of the present invention. In detail, the controller 130 may determine whether the vehicle coasts based on whether the accelerator pedal is pressed, and when the vehicle coasts, the controller 130 may determine whether to change the gear ratio of the transmission based on the number of RPM of the engine.

In more detail, the controller 130 determines whether the accelerator pedal is pressed. The controller 130 may determine whether the accelerator pedal is pressed based on the information related to the pressed state of the accelerator pedal obtained from the sensor 110. When it is determined that the accelerator pedal is not pressed, the controller 130 determines that the vehicle is in the coasting state. When it is determined that the accelerator pedal is pressed, the controller 130 determines that the vehicle is not in the coasting state. In the instant case, the coasting means driving by inertia rather than driving by the power of the vehicle. When it is determined that the vehicle is in the coasting state, the controller 130 may control to cut off the fuel supply. Meanwhile, the controller 130 may control to maintain a preset gear ratio when the vehicle is in an acceleration state.

The controller 130 determines whether the number of RPM of the engine exceeds a threshold value after the fuel supply is cut off. In the instant case, the threshold value may mean the minimum number of RPM of an engine at which the vehicle may be maintained in the turn-on state. When the controller 130 determines that the number of RPM of the engine exceeds the threshold value, the controller 130 may determine that the vehicle is maintained in the turn-on state at the number of RPM of the engine exceeding the threshold value.

When the controller 130 determines that the current number of RPM of the engine does not exceed the threshold value, the controller 130 may determine that the vehicle cannot be maintained in the turn-on state at the number of RPM of the engine speed below the threshold value. Accordingly, the controller 130 controls the engine to be continuously maintained in the turn-on state, that is, to raise the number of RPM such that the number of RPM exceeds the threshold value. To this end, the controller 130 may change the gear ratio of the transmission downshift.

Meanwhile, when the controller 130 determines that the current number of RPM of the engine exceeds the threshold value, the controller 130 determines whether the current gear ratio is the highest gear ratio. When the controller 130 determines that the current gear ratio is the highest gear ratio, as the number of RPM of the engine is decreased, the resistance to stop the vehicle is decreased, so that the driving distance of the vehicle may be increased during coasting. Therefore, when determining that the current gear ratio is the highest gear ratio, the controller 130 may determine that the fuel efficiency may be improved by maximizing the coasting distance.

To the contrary, when it is determined that the current gear ratio is not equal to the highest gear ratio, the controller 130 may determine that the current gear ratio may be changed upshift. Therefore, the controller 130 predicts and determines the number of RPM of the engine when the current gear ratio is changed upshift. According to an exemplary embodiment of the present invention, when the current gear ratio is changed upshift, the number 'A' of rotation of the engine may be determined Equation 1.

$$A = \text{Vehicle Speed} * \text{Gear Ratio(after being changed upshift)} * FGR/(\text{Tire Radius}) * 60/(2\pi) * 1000/3600$$
$$(FGR: \text{Final Gear Ratio}) \quad \text{<Equation 1>}$$

The controller 130 determines whether the number of RPM of the engine determined exceeds the threshold value when the current gear ratio is changed upshift. When the controller 130 determines that the determined number of RPM of the engine exceeds the threshold value, the controller 130 may determine that the turn-on of the vehicle may be maintained even at the determined number of RPM. That is, when the controller 130 determines that the determined number of RPM of the engine exceeds the threshold value, because the turn-on of the vehicle may be maintained even when the current gear ratio is changed upshift, the controller 130 controls to change the current gear ratio upshift.

The controller 130 may control to change the current gear ratio upshift to reduce the number of RPM of the engine. As the number of RPM of the engine is decreased, the drag is prevented from occurring due to the rotations of the engine and the transmission, so that the coasting distance may be increased by preventing the drag from acting as a resistance to stop the vehicle, increasing the coasting mileage. Therefore, the controller 130 may control to change the current gear ratio upshift, so that the driving distance of the vehicle is maximized when the vehicle coasts, improving the fuel efficiency of the vehicle.

Figure 2:
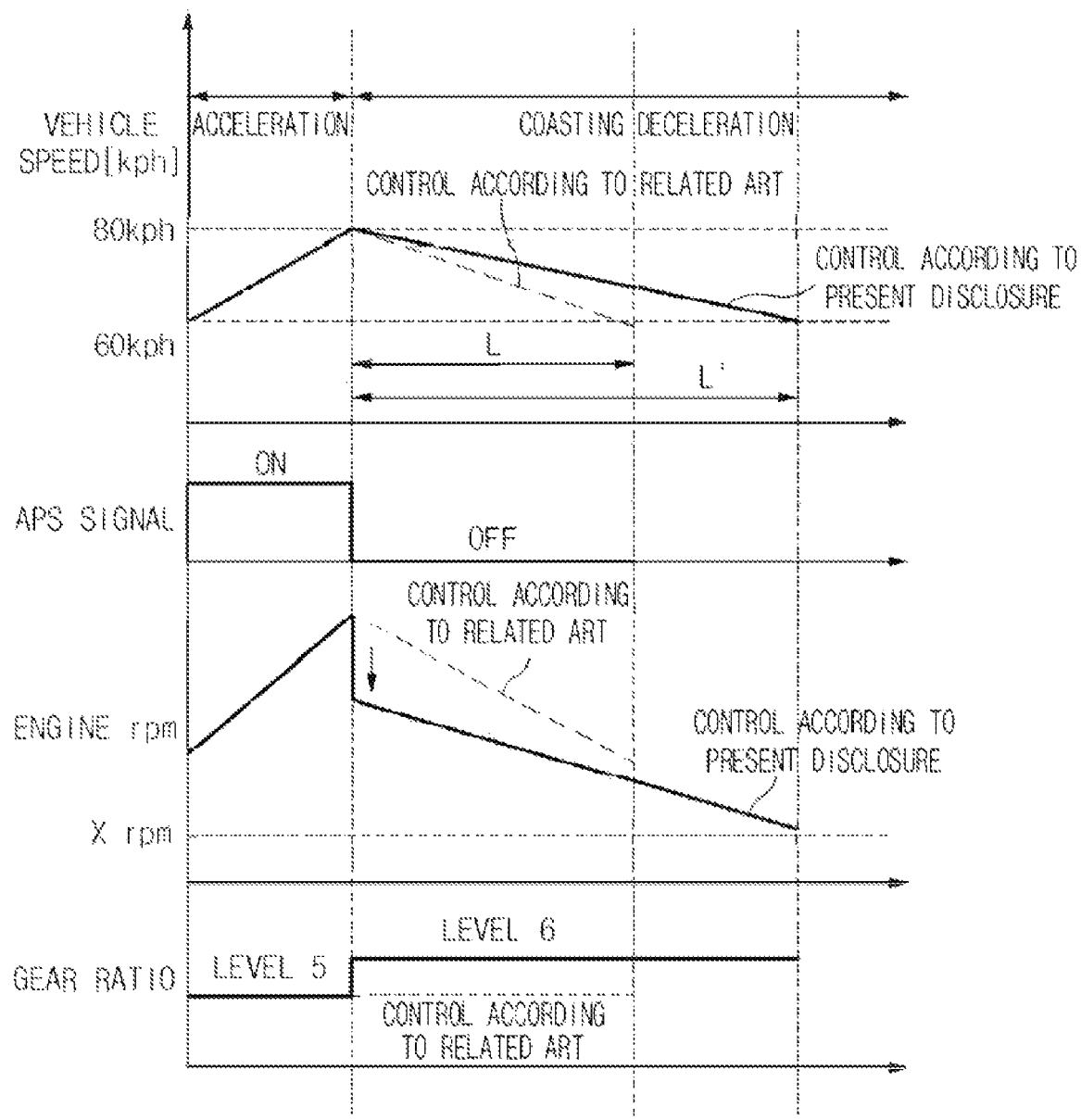
FIG. 2 and FIG. 3 are graphs illustrating a control result of an apparatus of controlling driving of a vehicle according to an exemplary embodiment of the present invention.
Figure 3:
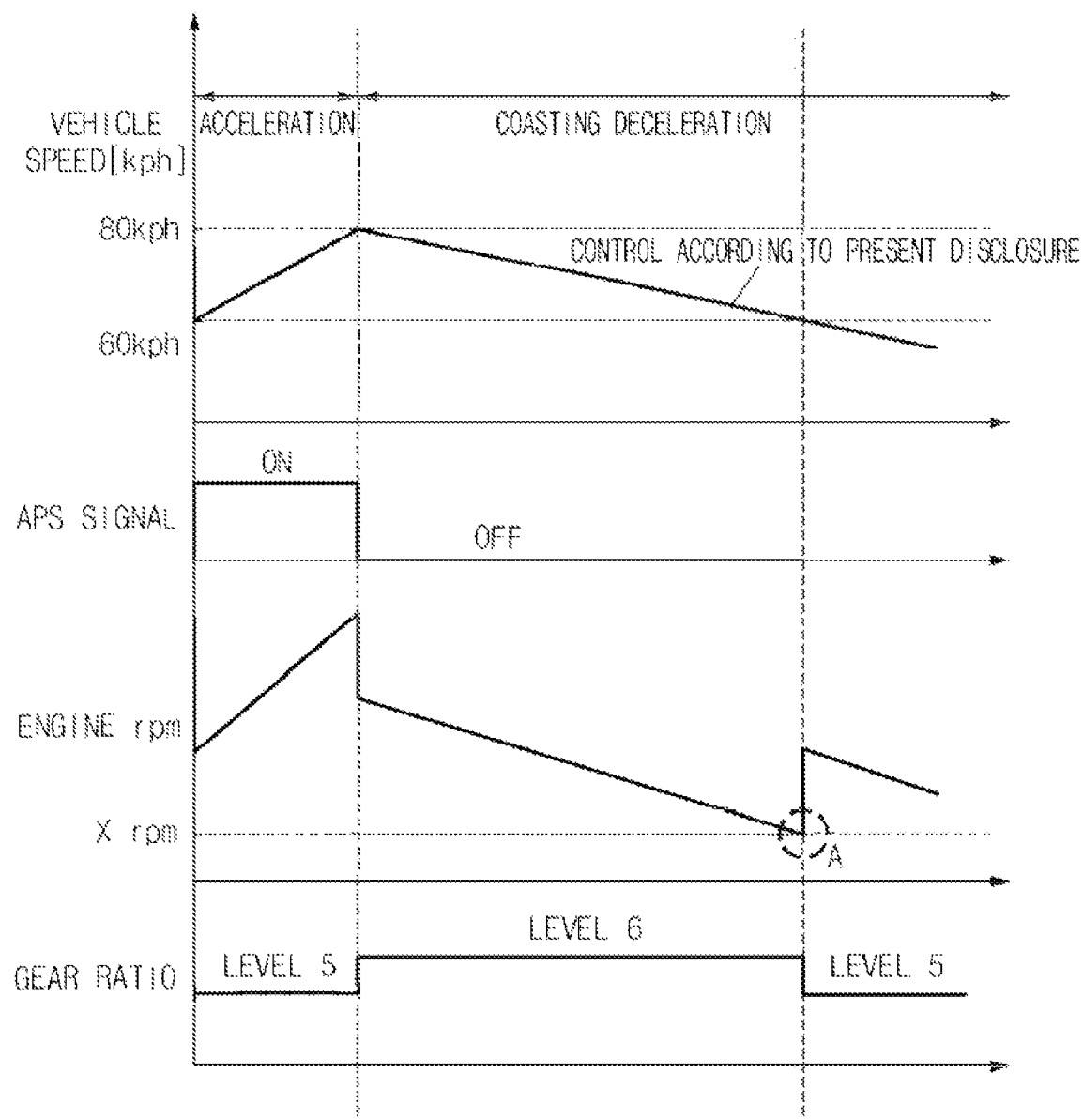

FIG. 2 and FIG. 3 are graphs illustrating a control result of an apparatus of controlling driving of a vehicle according to an exemplary embodiment of the present invention.

As shown in FIG. 2, when the controller 130 determines that the accelerator pedal is pressed, the controller 130 may determine that the vehicle is in an acceleration state. The controller 130 may determine whether the accelerator pedal is pressed in the accelerated state of the vehicle, and determine that the vehicle is in a coasting state when the accelerator pedal is not pressed. When it is determined that the accelerator pedal is not pressed, the controller 130 may cut off the fuel supply. When it is possible to change the gear ratio of the transmission upshift, the controller 130 may increase the gear ratio of the transmission upshiftly such that the number of RPM of the engine is decreased, increasing the mileage of the vehicle during coasting.

In more detail, the vehicle is decelerated in the coasting state. The controller 130 may determine whether the gear ratio of the transmission is the maximum gear ratio in a coasting deceleration section. When it is determined that the gear ratio of the transmission is not the maximum gear ratio, the controller 130 may determine that it is possible to change the gear ratio upshift.

When the controller 130 determines that it is possible to change the gear ratio upshift, the controller 130 may determine the number of RPM of the engine when the gear ratio is changed upshift. When the determined number of RPM of the engine exceeds the threshold value, that is, the controller 130 determines that the turn on of the engine may be maintained at the determined number of RPM of the engine, the controller 130 controls to change the gear ratio upshift.

According to an exemplary embodiment of the present invention, as shown in FIG. 2, the controller 130 may control to change the gear ratio from level '5' to level '6'.

According to the related art, because the gear ratio in an acceleration state is maintained even when the vehicle coasts, the number of RPM of the engine is reduced from the number of RPM of the engine corresponding to the gear ratio in the acceleration state. Because the number of RPM of the engine is large in the acceleration state, the large number of RPM acts as a resistance to stop the vehicle in the coasting state so that the driving distance 1' of the vehicle is reduced during coasting, lowering the fuel efficiency.

However, the controller 130 according to an exemplary embodiment of the present invention determines whether to change the gear ratio upshift and controls to change the gear ratio upshift, reducing the number of RPM of the engine. The number of RPM of the engine is reduced to prevent the coasting from acting as a resistance to stop the vehicle in the coasting state, so that the vehicle driving distance 1" is increased during coasting of the vehicle, improving the fuel efficiency. In more detail, the fuel efficiency determined when the gear ratio is changed upshift according to an exemplary embodiment of the present invention is shown in following Table 1.

TABLE 1

| Gear ratio in deceleration | Acceleration | | Deceleration | | | Total fuel efficiency km/l |
|---|---|---|---|---|---|---|
| | Mileage M | Fuel amount kg | Mileage M | Fuel amount Kg | Number of RPM of engine rpm | |
| Level 5 | 305.7 | 0.0201 | 331.0 | 0 | 2225→1671 | 23.54 |
| Level 6 | 305.7 | 0.0201 | 369.8 | 0 | 1740→1288 | 24.98 |

Furthermore, as shown in FIG. 3, when the number of RPM of the engine is continuously lowered while the vehicle coasts at the gear ratio changed upshift, the controller 130 determines whether the number of RPM of the engine is lowered below the threshold value 'X'. In the instant case, the threshold value 'X' is the number of RPM of the engine at which the turn-on of the vehicle may be maintained. The controller 130 may determine that the turn-on of the vehicle cannot be maintained when the number of RPM of the engine is lower than the threshold value.

When the number of RPM of the engine is lowered below the threshold value 'X' (A), because the turn-on of the vehicle cannot be maintained, to prevent this, the controller 130 changes the gear ratio downshift such that the number of RPM of the engine exceeds the threshold value when the number of RPM of the engine is equal to or less than the threshold value. According to an exemplary embodiment of the present invention, the controller 130 may control the gear ratio from level '6' to level '5'.

Figure 4:
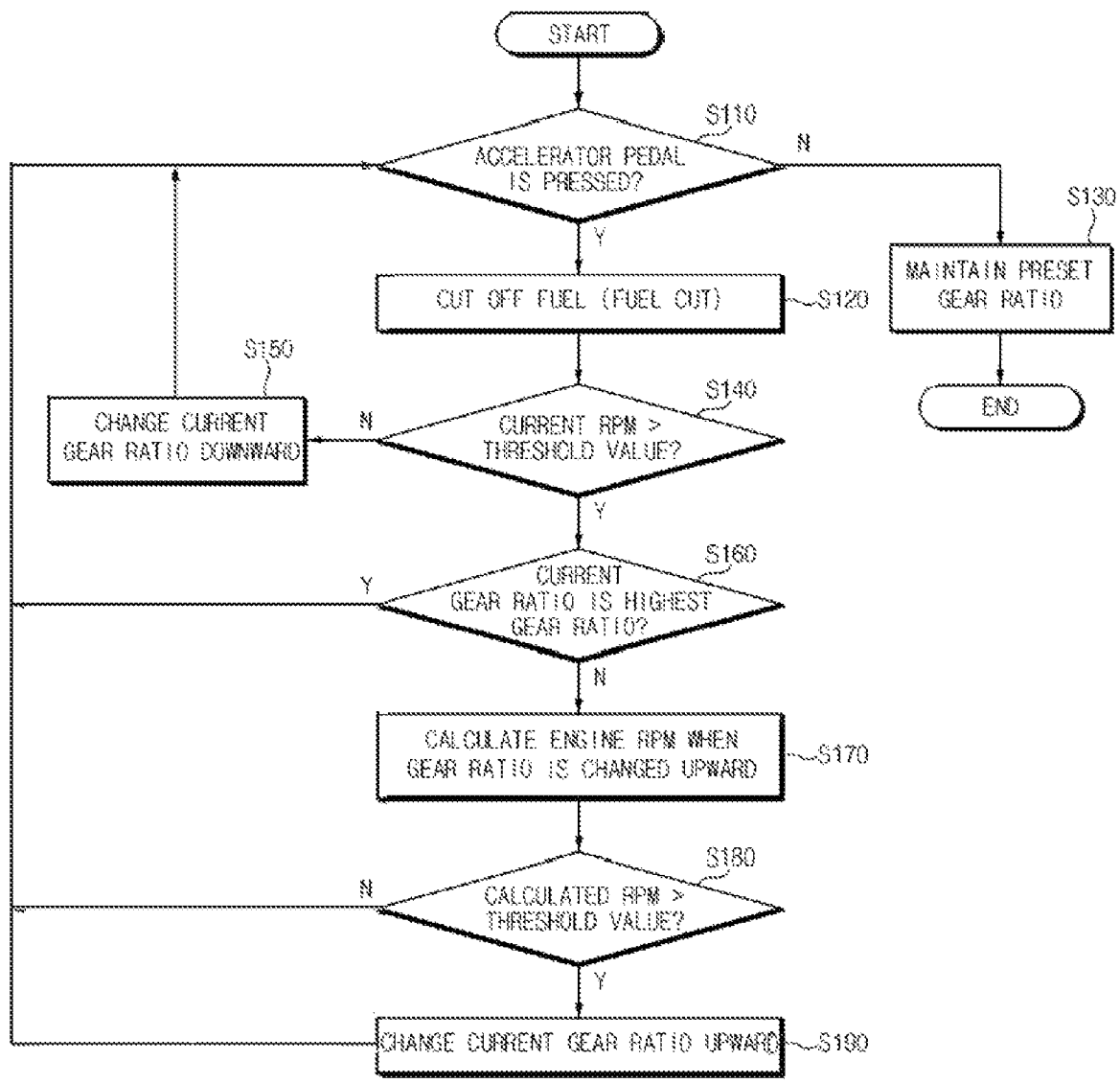
FIG. 4 is a flowchart illustrating a method of controlling driving of a vehicle according to an exemplary embodiment of the present invention.

FIG. 4 is a flowchart illustrating a method of controlling driving of a vehicle according to an exemplary embodiment of the present invention.

As shown in FIG. 4, in S110, the controller 130 determines whether the accelerator pedal is pressed. In S110, the controller 130 may determine whether the accelerator pedal is pressed based on the information related to the pressed state of the accelerator pedal obtained from the sensor 110.

When it is determined in S110 that the accelerator pedal is not pressed (Y), the controller 130 determines that the vehicle is in a coasting state. When it is determined that the accelerator pedal is pressed (N), the controller 130 determines that the vehicle is not in the coasting state because the vehicle is in an accelerating state. In the instant case, the coasting means driving by inertia rather than driving by the power of the vehicle.

When it is determined in S110 that the vehicle is in the coasting state, in S120, the controller 130 controls to cut off the fuel supply. Meanwhile, when it is determined in S110 that the vehicle is in an accelerating state, in S130, the controller 130 may control to maintain the preset gear ratio.

In S140, the controller 130 determines whether the number of RPM of the engine exceeds the threshold value after the fuel supply is cut off. In the instant case, the threshold value may mean the minimum number of RPM of the engine at which the vehicle is maintained in the turn-on state.

When it is determined in S140 that the number of RPM of the engine exceeds the threshold value (Y), the controller 130 determines that the vehicle may be maintained in the turn-on state at the number of RPM of the engine that exceeds the threshold value. When it is determined in S140 that the current number of RPM of the engine does not exceed the threshold value (N), the controller 130 may determine that it is impossible to maintain the turn-on state of the vehicle at the number of RPM of the engine which is equal to or less than the threshold value. Thus, in S150, the controller 130 changes the gear ratio of the transmission downshift. In S150, the controller 130 changes the gear ratio downshift to control the number of RPM of the engine upshift such that the number of RPM of the engine exceeds the threshold value, continuously maintaining the turn-on of the vehicle. Thereafter, the controller 130 performs S110.

Meanwhile, when it is determined in S140 that the current number of RPM of the engine exceeds the threshold value (Y), the controller 130 determines whether the current gear ratio is the highest gear ratio in S160. When it is determined in S160 that the current gear ratio is the highest gear ratio (Y), because the resistance to stop the vehicle decreases as the number of RPM of the engine reduces, the controller 130 may increase the mileage of the vehicle during coasting. Therefore, when it is determined that the current gear ratio is the highest gear ratio, the controller 130 may determine that fuel efficiency may be improved by maximizing the coasting distance. Thereafter, the controller 130 goes to S110.

To the contrary, when it is determined in S160 that the current gear ratio is not equal to the highest gear ratio (N), the controller 130 may determine that it is possible to change the current gear ratio upshift. Therefore, the controller 130 estimates and determines the number of RPM of the engine when the gear ratio is changed upshift in S170. According to an exemplary embodiment of the present invention, in S170, the controller 130 may determine the number 'A' of RPM of the engine by use of Equation 1 described above when changing the gear ratio upshift.

In S180, the controller 130 determines whether the number of RPM of the engine determined in S170 exceeds the threshold value. When it is determined in S180 that the determined number of RPM of the engine exceeds the threshold value (Y), the controller 130 may determine that it is possible to maintain the turn-on state of the vehicle at the determined number of RPM of the engine. That is, when it is determined that the determined number of RPM of the engine exceeds the threshold value (Y), because the turn-on state of the vehicle may be maintained even when the current gear ratio is changed upshift, in S190, the controller 130 controls to change the current gear ratio upshift. Meanwhile, when it is determined that the determined number of RPM of the engine does not exceed the threshold value (N), the controller 130 returns to S110.

The controller 130 may control to change the current gear ratio upshift, so that the number of RPM of the engine is lowered. As the number of RPM of the engine is lowered, the drag may be prevented from occurring due to the rotation of the engine and the transmission, so that the coasting does not act as a resistance to stop the vehicle, increasing the coasting mileage. Therefore, the controller 130 may control to change the current gear ratio upshift such that the mileage of the vehicle is maximized, improving the fuel efficiency of the vehicle.

Furthermore, the term "controller" refers to a hardware device including a memory and a processor configured to execute one or more steps interpreted as an algorithm structure. The memory may be a non-transitory storage medium including program instructions which store algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

According to the exemplary embodiments of the present invention, the apparatus and method for controlling driving of a vehicle can increase the coasting mileage in the coasting deceleration section, improving the fuel efficiency of the vehicle.

The above description is a simple exemplification of the technical spirit of the present invention, and the present invention may be variously corrected and modified by those skilled in the art to which an exemplary embodiment of the present invention pertains without departing from the essential features of the present invention.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling driving of a vehicle, the apparatus comprising:
   a first sensor configured to detect whether an accelerator pedal of the vehicle is pressed,
   a second sensor configured to detect a number of revolution per a minute (RPM) of an engine of the vehicle; and
   a controller electrically connected to the first sensor and the second sensor and configured to determine whether the vehicle coasts based on whether the accelerator pedal is pressed, and determine whether to change a gear ratio of a transmission based on the number of RPM of the engine when the vehicle coasts,
   wherein the controller is configured to determine the number of RPM of the engine corresponding to a gear ratio higher than a current gear ratio when the current gear ratio is not equal to a highest gear ratio, and
   wherein the controller is configured to determine whether the determined number of RPM of the engine exceeds a threshold value, and change the current gear ratio to upshift when the determined number of RPM of the engine exceeds the threshold value.

2. The apparatus of claim 1, wherein, when the controller determines that the accelerator pedal is not pressed and thus the vehicle coasts, the controller is configured to determine whether the number of RPM of the engine exceeds the threshold value, and determine whether the current gear ratio of the transmission is equal to the highest gear ratio when the number of RPM of the engine exceeds the threshold value.

3. The apparatus of claim 2, wherein, when the controller determines that the accelerator pedal is not pressed and thus the vehicle coasts, the controller is configured to change the current gear ratio to downshift when the number of RPM of the engine does not exceed the threshold value.

4. The apparatus of claim 1, wherein the controller is configured to control to maintain a predetermined gear ratio of the transmission when the controller determines that the accelerator pedal is pressed.

5. The apparatus of claim 1, wherein the controller includes:
   a processor; and
   a non-transitory storage medium on which a program for determining whether the vehicle coasts based on whether the accelerator pedal is pressed, and determining whether to change the gear ratio of the transmission based on the number of RPM of the engine when the vehicle coasts, is recorded and executed by the processor,
   wherein the program is configured to determine the number of RPM of the engine corresponding to the gear ratio higher than the current gear ratio when the current gear ratio is not equal to the highest gear ratio, and
   wherein the program is configured to determine whether the determined number of RPM of the engine exceeds the threshold value, and change the current gear ratio to upshift when the determined number of RPM of the engine exceeds the threshold value.

6. A method for controlling driving of a vehicle, the method comprising:
   detecting whether an accelerator pedal of the vehicle is pressed and detecting a number of RPM of an engine of the vehicle;
   determining, by a controller, whether the vehicle coasts based on whether the accelerator pedal is pressed, and determining, by the controller, whether to change a gear ratio of a transmission based on the number of RPM of the engine when the vehicle coasts;
   determining, by the controller, the number of RPM of the engine corresponding to a gear ratio higher than a current gear ratio when the current gear ratio is not equal to a highest gear ratio;
   determining, by the controller, whether the determined number of RPM of the engine exceeds a threshold value; and
   changing, by the controller, the current gear ratio to upshift when the determined number of RPM of the engine exceeds the threshold value.

7. The method of claim 6, further including:
   when the controller determines that the accelerator pedal is not pressed and thus the vehicle coasts,
   determining, by the controller, whether the number of RPM of the engine exceeds the threshold value; and
   determining, by the controller, whether the current gear ratio of the transmission is equal to the highest gear ratio when the number of RPM of the engine exceeds the threshold value.

8. The method of claim 7, further including:
   changing, by the controller, the current gear ratio to downshift when the number of RPM of the engine does not exceed the threshold value.

9. The method of claim 6, further including:
   controlling, by the controller, to maintain a predetermined gear ratio of the transmission when the accelerator pedal is determined to be pressed.

10. The method of claim 6, wherein the controller includes:
    a processor; and
    a non-transitory storage medium on which a program for performing the method of claim 6 is recorded and executed by the processor.

11. A non-transitory computer readable medium on which a program for performing the method of claim 6 is recorded.

* * * * *